UNITED STATES PATENT OFFICE.

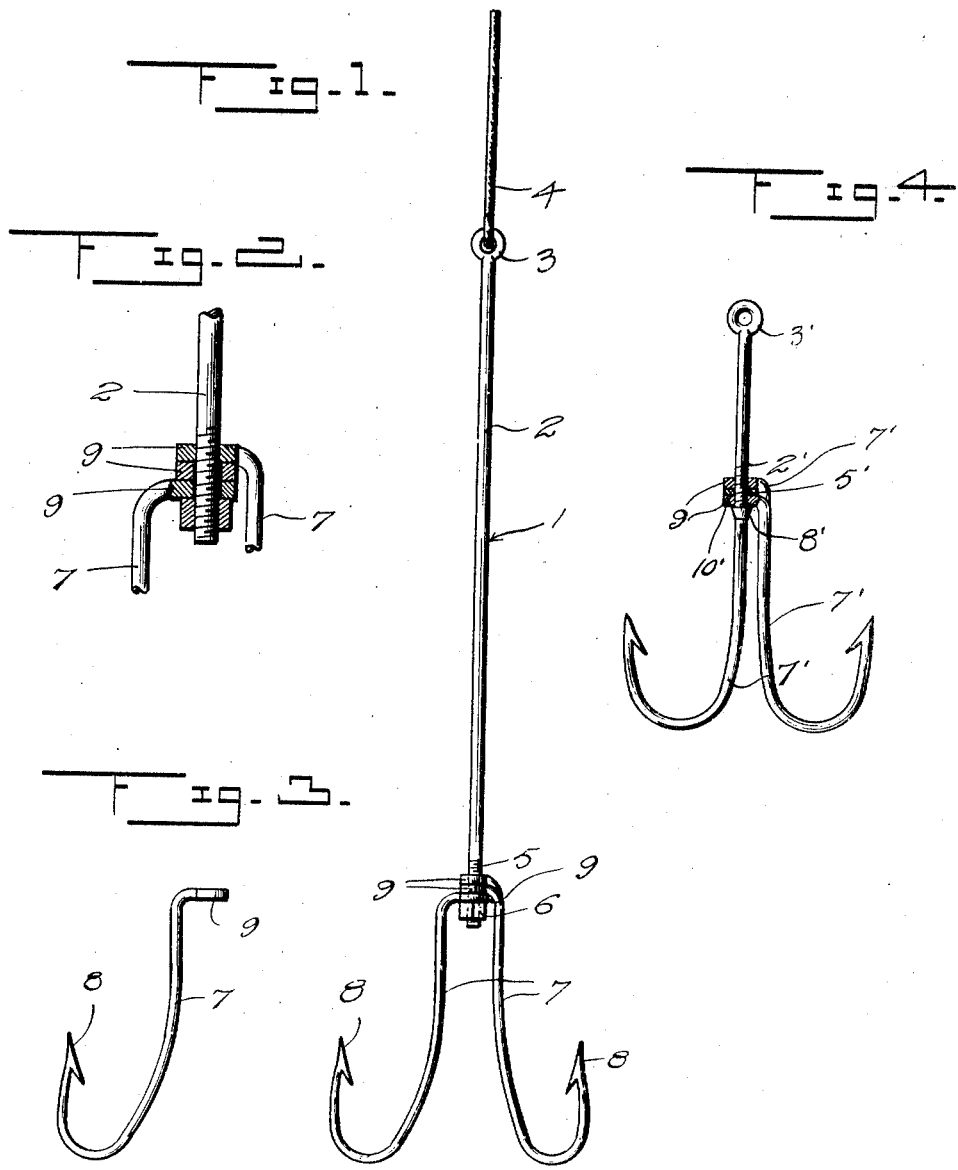

PERRY A. COLE, OF ELIZABETHTOWN, NEW YORK.

FISHHOOK-GRAPPLE.

1,334,839.

Specification of Letters Patent.  Patented Mar. 23, 1920.

Application filed April 30, 1919. Serial No. 293,597.

*To all whom it may concern:*

Be it known that I, PERRY A. COLE, a citizen of the United States, residing at Elizabethtown, in the county of Essex and State of New York, have invented certain new and useful Improvements in Fishhook-Grapples; and I do hereby declare the following to be a full, clear, and exact description of the invention, such as will enable others skilled in the art to which it appertains to make and use the same.

This invention relates to new and useful improvements in grapples and has for one of its objects the provision of means whereby the hooks can be readily folded one upon the other when not desiring to use the device so that it can be conveniently carried in a pocket or stored in a considerably small space.

Another object of this invention is the provision of means for connecting the hooks to the shank of the device so that the hooks can be folded whenever desired and which will hold the hooks rigid and in their proper position when using the device.

A further object of this invention is the provision of a fish hook grapple of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawing, in which:

Figure 1 is a side elevation of a grapple constructed in accordance with my invention, Fig. 2 is a detail sectional view of the means of connecting the hooks to the shank of the device, Fig. 3 is a plan view of one of the hooks, and Fig. 4 is a side elevation partly in section of a modified form of my invention.

Referring in detail to the drawing, the numeral 1 indicates as an entirety a grapple consisting of a shank or rod 2 of any desired length having formed at its upper ends an eye 3 to which may be connected an ordinary cable or hoisting element 4. The lower end of the shank or rod 2 is screw threaded as illustrated at 5 for receiving a nut 6.

A plurality of hooks 7 preferably in the shape of fishing hooks having the usual pointed and barbed ends 8 are secured to the shank or rod 2. The shank portions of the hooks 7 have formed on their upper ends angularly related eyes 9 that receive the rod or shank 2.

The angularly related eyes 9 are positioned upon the rod or shank 2 one above the other with the hooks 7 relatively spaced and the uppermost angularly related eye 9 is screw threaded for threaded connection with the rod or shank 2. After the hooks have been applied to the rod or shank 2 the nut 6 is turned on to the lower end of said shank for coöperation with the threaded eye 9 of one of the hooks in retaining the hooks in their power spaced relation. When it is desired to collapse the hooks or fold them upon the other, the hook having the screw threaded eye 9 is turned or threaded on the rod 2 or shank away from the other eyes 9 so that the other hooks may be folded onto the respective hook, thus placing the device in a collapsed or folded condition so that it can be conveniently carried or stored in a considerably small space. If desired the nut 6 may be substituted by an integral head. By employment of the nut on the rod or shank 2 permits of the removal of any one of the hooks whenever desired, this being desirable when one of the hooks has become injured or broken during the use of the device.

Referring to Fig. 4 which illustrates a modified form of my invention, the shank 2 has formed integrally therewith, one of the hooks 7' and is screw threaded as at 5 above an integral collar 8'. The other hooks 7' have their eyes 9' threaded on the shank and against the collar 8' and have positioned between the eyes a washer 10.

The eyes 9' are placed on the shank prior to the forming of the eye 3'.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A grapple comprising a shank having one end screw threaded, a plurality of hooks, angularly related eyes formed on said hooks and positioned upon said rod, the uppermost one of said eyes being internally screw threaded for threaded connection with said shank, and a nut threaded on to the shank for coöperation with the screw threaded eye in retaining the hooks in their proper position or for permitting the hooks to be folded one upon the other.

2. A grapple comprising a shank, a plurality of hooks, eyes formed on said hooks and receiving the shank and arranged one above the other, means locking the uppermost eye against rotation on the shank when placed under pressure, and a nut threaded to the shank and bearing against the lowermost eye and adapted to cause pressure against the eyes for holding the hooks in spread or folded position.

In testimony whereof I affix my signature in presence of two witnesses.

PERRY A. COLE.

Witnesses:
CHAS. DOUGAN,
ROBERT H. WOOD.